(12) United States Patent
Lock et al.

(10) Patent No.: US 11,715,998 B2
(45) Date of Patent: *Aug. 1, 2023

(54) SWITCHING DEVICE FOR SWITCHING AN ELECTRIC MOTOR

(71) Applicant: Lock Antriebstechnik GmbH, Ertingen (DE)

(72) Inventors: Frank Lock, Ertingen (DE); Patrick Niederer, Riedlingen-Zwiefaltendorf (DE); Tobias Fluhr, Ertingen (DE)

(73) Assignee: Lock Antriebstechnik GmbH, Ertingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,884

(22) Filed: Jun. 8, 2022

(65) Prior Publication Data

US 2022/0302797 A1   Sep. 22, 2022

Related U.S. Application Data

(63) Continuation of application No. 15/498,592, filed on Apr. 27, 2017, now Pat. No. 11,387,715.

(30) Foreign Application Priority Data

Apr. 29, 2016 (DE) ..................... 10 2016 108 007.1

(51) Int. Cl.
*H02K 11/21* (2016.01)
*H02P 31/00* (2006.01)
(Continued)

(52) U.S. Cl.
CPC .............. *H02K 11/21* (2016.01); *E05F 15/40* (2015.01); *E05F 15/603* (2015.01); *G01D 5/20* (2013.01);
(Continued)

(58) Field of Classification Search
USPC .......................................................... 318/466
See application file for complete search history.

(56) References Cited

U.S. PATENT DOCUMENTS

| | | | | |
|---|---|---|---|---|
| 4,338,553 A | * | 7/1982 | Scott, Jr. ................. | E05F 15/40 49/31 |
| 4,651,073 A | | 3/1987 | Shimizu | |

(Continued)

FOREIGN PATENT DOCUMENTS

| | | |
|---|---|---|
| DE | 20 2004 009 047 U1 | 9/2004 |
| DE | 20 2006 017 803 U1 | 4/2008 |

(Continued)

OTHER PUBLICATIONS

German Search Report (Application No. 10 2016 108 007.1) dated Mar. 29, 2017.

(Continued)

*Primary Examiner* — Jorge L Carrasquillo
(74) *Attorney, Agent, or Firm* — Burr Patent Law, PLLC

(57) ABSTRACT

A geared motor is provided, including an electric motor, a transmission, a drive shaft and a switching device arranged on the drive shaft. The switching device includes a single housing that is distinct and separate from an electric motor housing and a transmission housing. The switching device also includes a contactless, absolute position-measuring device and an evaluation unit, each provided within the single housing, a gear wheel coupled to the drive shaft, and an output unit. The switching device is coupled to the position-measuring device by a pinion, which rotates about the same rotational axis as the drive shaft.

14 Claims, 3 Drawing Sheets

(51) Int. Cl.
*H02P 6/16* (2016.01)
*H02K 7/116* (2006.01)
*E05F 15/603* (2015.01)
*E05F 15/40* (2015.01)
*G01D 5/20* (2006.01)

(52) U.S. Cl.
CPC ............... *H02K 7/116* (2013.01); *H02P 6/16* (2013.01); *H02P 31/00* (2013.01); *E05Y 2400/32* (2013.01); *E05Y 2400/40* (2013.01); *E05Y 2400/445* (2013.01); *E05Y 2900/11* (2013.01); *E05Y 2900/148* (2013.01)

(56) References Cited

U.S. PATENT DOCUMENTS

| | | | |
|---|---|---|---|
| 4,764,767 A | | 8/1988 | Ichikawa |
| 5,024,116 A | * | 6/1991 | Kraft .................... F15B 15/065 74/109 |
| 6,163,117 A | | 12/2000 | Rappenecker |
| 7,804,264 B2 | | 9/2010 | Antov |
| 7,804,265 B2 | | 9/2010 | Hoermann |
| 8,508,168 B2 | | 8/2013 | Duits |
| 11,387,715 B2 | * | 7/2022 | Lock ...................... H02K 11/21 |
| 2008/0119964 A1 | | 5/2008 | Hoermann |
| 2009/0102466 A1 | | 4/2009 | Yamada |
| 2010/0176695 A1 | | 7/2010 | Tezuka |
| 2013/0133447 A1 | | 5/2013 | Leivenzon et al. |
| 2013/0141030 A1 | * | 6/2013 | Duits ....................... H02K 7/06 310/68 B |
| 2016/0365771 A1 | | 12/2016 | Kokubo |

FOREIGN PATENT DOCUMENTS

| | | | |
|---|---|---|---|
| DE | 10 2009 050 185 A1 | | 10/2010 |
| GB | 2 289 351 A | | 11/1995 |
| GB | 2289351 A | * | 11/1995 .............. E05F 15/41 |
| KR | 20090015977 A | * | 2/2009 |
| WO | 2009/146738 A1 | | 12/2009 |

OTHER PUBLICATIONS

Extended European Search Report (Application No. 17166536.7) dated Nov. 8, 2017.

* cited by examiner

SWITCHING DEVICE FOR SWITCHING AN ELECTRIC MOTOR

This application is a Continuation of U.S. application Ser. No. 15/498,592, filed Apr. 27, 2017 and claims the benefit under 35 USC § 119(a)-(d) of German Application No. 10 2016 108 007.1 filed Apr. 29, 2016, the entireties of which are incorporated herein by reference.

FIELD OF THE INVENTION

The present invention relates to a switching device for switching an electric motor and to a transmission, a motor, a geared motor or a drive system having such a switching device.

BACKGROUND OF THE INVENTION

Switching devices for switching an electric motor, in particular a geared motor, are known in a wide variety of designs.

A known switching device is embodied, for example, as a mechanical or an electronic switch which makes available two switching states for switching an electric power supply of the motor. The switch is mounted here, for example, directly on a housing of the geared motor.

The switch acts here, for example, independently of a status of the component driven by the motor.

SUMMARY OF THE INVENTION

The present invention is based on the object of making available an alternative switching device for switching an electric motor.

The present invention is based on a switching device for switching an electric motor, wherein the switching device is arranged on a component which is driven in rotation by the motor.

The motor is advantageously embodied as a geared motor. The component which is driven in rotation is, for example, part of the geared motor, for example a shaft or a gearwheel of the geared motor.

The component positions and/or shifts, for example, a drive system for opening or closing openings in buildings, such as, for example windows, roof openings, wings or flexible walls, or for opening and closing shade systems or ventilation systems or for raising and lowering loads. The component can also be part of such a drive system.

It is also conceivable that the component drives a drive system for opening or closing doors or gates.

The drive systems are used, for example, in gardening, in steel construction and/or in glass construction, for example in greenhouses. The drive systems for positioning, in particular for raising and/or lowering loads is used, inter alia, in mechanical engineering.

The essential aspect of the present invention is to be considered that a contactless, absolute position-measuring device, an evaluation unit for evaluating position signals and an output unit for outputting switching information for indirectly switching and/or directly switching the motor current as a function of a position signal are provided within a single housing.

The position-measuring device can sense a position of the component absolutely. The position-measuring device is preferably constructed in such a way that it senses a change in the position of the component on the basis of a change in a magnetic field.

In one advantageous embodiment of the switching device, the output unit is provided for switching a control voltage of the motor as a function of a position signal. The control voltage is provided for controlling, for example, an electrical relay or a frequency converter and/or for supplying switching information, wherein the relay or the frequency converter is configured to switch the motor current.

The output unit is provided, in particular, for switching off the motor current and/or a control voltage of the motor as a function of a position signal. The output unit can therefore indirectly or directly switch the motor current.

The switching device is advantageously arranged on a shaft which is driven by the motor, in particular, in the housing of the drive and/or in the housing of the motor or in the housing of the geared motor.

In one advantageous modification of the switching device, the position-measuring device is configured to sense a rotation of the component which is driven in rotation.

The position-measuring device advantageously senses a single, in particular, complete, rotation and/or a multiplicity of rotations of the component which is driven in rotation.

It is also advantageous that the position-measuring device is configured in such a way that when the external supply power is switched off it senses the position of the component which is driven in rotation absolutely.

When the supply power is activated the position-measuring device advantageously signals the current position of the component to the evaluation unit.

The switching device and/or the position-measuring device and/or the motor comprises, for example, a buffered internal electrical energy system, for example a battery, an accumulator or a capacitor. As a result, for example, the motor and/or the switching device continues to be functionally capable at least for a certain time even when the supply power is switched off. For example, the switching device is configured to detect switching off of an external supply power. Furthermore, the switching device can be configured, in the event of detection of a switching off of the external supply power, to command the motor such that it uses the power of its internal power system to drive the components arranged on the motor in such a way that the components can be positioned in a safety position.

Moreover, it is advantageous that the position-measuring device is configured to supply itself with power.

For example, the position-measuring device acquires power on the basis of magnetic induction, for example, by means of a rotational movement of the component. The position-measuring device is, for example, configured to detect and to store a number of rotational movements of the component in the event of external and internal power sources being switched off.

The output unit is advantageously configured to switch, as a function of a position of the component, a single-phase and/or multi-phase power supply of the electric motor by means of a switching element.

For example, the output unit is configured to switch supply voltages of 230V AC, 24V AC, 48V AC and/or 24V DC, directly, in particular in the case of a single-phase supply voltage, and/or via the switching element, for example a switch and/or a relay and/or a frequency converter advantageously in the case of a multi-phase supply voltage.

Furthermore, it is proposed that the switching device is configured to output a position of the component.

In one advantageous embodiment, the switching device is configured to output a limit position. The switching device preferably outputs an analog potential, in particular a potential range of, for example, 10V relative to ground, wherein, for example, a potential deficit 5V with respect to ground corresponds to a center position of the component.

It is also conceivable that the switching device has a data interface. The outputting of the position of the component can be performed by way of an analog and/or digital data interface. The data interface is, in particular, BUS-enabled, for example CANopen, Ethercat, Profibus, Profinet, MODBus, DACNET, KNX and/or IO link.

The data interface is for example cable-bound. For example, the data interface is embodied as a network interface with an Ethernet connection or fieldbus connection and/or in a cabless fashion, for example, according to a WLAN standard or Bluetooth standard.

Moreover, it is advantageous that the switching device comprises a sensing element by means of which a fitter of the switching device can teach a position, in particular limit position of the component, during installation of the switching device.

It is also conceivable that the switching device determines positions of the component automatically, for example in a learning run. For example, the switching device commands the motor in one of the two directions of rotation until the switching device receives a signal, triggered, for example, by a limit switch or an increase in the motor current and/or a drop in the rotational speed and infers the position of the component therefrom.

It is also conceivable that the switching device is configured in such a way that a position of the component can be predefined from the outside by a user and/or a data system via a data link. By means of the predefinition of a setpoint position of the component from the outside, the switching device can be commanded, for example to switch the motor current in such a way that the component is moved to the setpoint position. A speed of the component can advantageously be predefined from the outside, in particular the switching device, via the data link.

In one advantageous variant of the switching device, the power supply of the motor is conducted through the switching device.

The switching device advantageously comprises connection means, for example connection terminals, for connecting a power supply line, for example, a power grid voltage and connection elements, in order to arrange a supply cable for the electric motor. In the switching device, the supply voltage is conducted for example, from the connection means via the output unit to the connection elements for the supply cable of the motor, and if appropriate the switching device has a transformer.

It is also advantageous that the switching device, in particular the evaluation unit, is configured in such a way that in one direction of rotation, in particular in each direction of rotation, of the component there are two signal outputs which are independent of one another.

The evaluation unit advantageously switches the switching state of a signal output where a position of the component which is driven in rotation is reached, which position is raised from the absolute position-measuring device.

For example, the switching device has, for each direction of rotation, two, in particular physical, signal outputs, for example, switching outputs, which can be used and switched independently of one another. The switching states of the signal outputs are generated, in particular, independently of one another and used, for example, for switching two driving states and/or to protect a limit position switch-off means. The two signal outputs of a rotational direction are, for example, of redundant design.

It is also conceivable that the switching device has, in addition to the physical signal outputs, a further, in particular, software-induced, signal output. A switching state of the software-induced signal output is advantageously generated independently of a physical switching state, in particular, independently of a further switching state of a further software-induced signal output. The physical signal outputs are used, for example, to switch off a movement of the component, in particular, when a limit position is reached. The software-induced switching state switches, for example, a driving state when a position of the component is reached. The software-induced switching state advantageously switches a driving state in such a way that a speed of movement of the component is reduced or increased. As a result, a start-up movement from and/or to a limit point can be defined. In particular, maximum acceleration of the component can be defined as a result of this in the case of a start-up movement and/or a braking movement from and/or to a limit point. As a result of this, wear of all the components of the drive system and/or the driven elements is advantageously reduced.

In one advantageous modification of the present invention, the switching device is configured in such a way that it satisfies the safety requirement level 1 or safety integrity level 1 (SIL 1) of the IEC 61508/IEC61511 standard.

A preferred refinement of the present invention is a transmission having a switching device.

The transmission can be embodied in a transmission housing, for example, in a transmission housing of a geared motor, and the switching device can be arranged in the transmission housing. The switching device is accommodated with the transmission in this case in a single housing, the transmission housing. The switching device can also be embodied in a separate housing within the transmission housing.

In one advantageous refinement of the present invention, the housing of the switching device is also arranged on the transmission housing and/or on the housing of the motor or geared motor, in particular, the housing of the switching device adjoins the housing of the motor and/or the housing of the geared motor and/or the housing of the transmission. For this purpose, for example, corresponding mechanical and/or electrical connecting means are embodied, on the transmission housing and, for example, on the housing of the switching device. The housing of the switching device can therefore be embodied in a piggyback fashion or as a rucksack arrangement on the housing of the motor and/or on the housing of the geared motor and/or the housing of the transmission.

It is conceivable that the switching device is arranged on a motor shaft between the motor and transmission.

The switching device is preferably embodied on a transmission of the motor.

One advantageous design of the invention is a drive system having a switching device, a geared motor and a component driven by the geared motor.

The evaluation unit is advantageously configured to execute and evaluate a status monitoring process of the drive system, and subsequently to perform, if appropriate, an action, in particular, by means of the output unit.

BRIEF DESCRIPTION OF THE DRAWINGS

A plurality of exemplary embodiments are explained in more detail on the basis of the following schematic drawings, with an indication of further details and advantages.

DETAILED DESCRIPTION OF THE INVENTION

Figure 1:
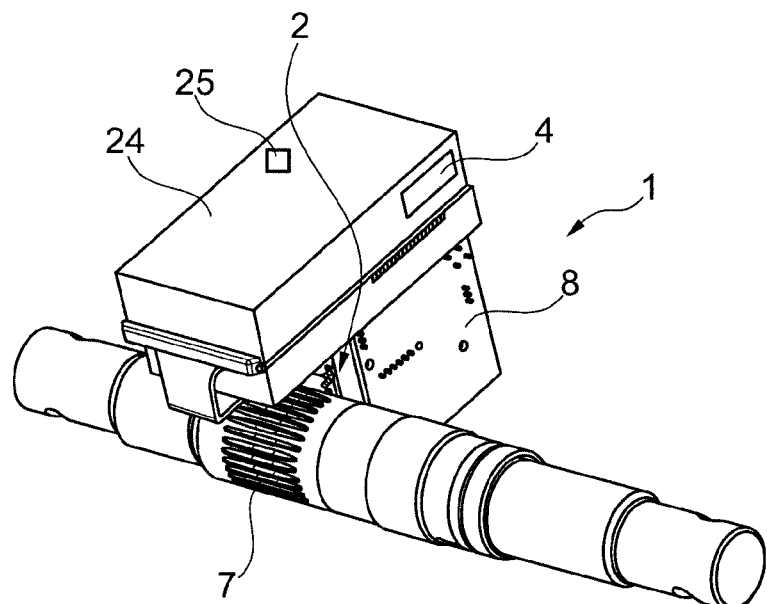
FIGS. 1 to 3 show a view of a switching device according to the present invention which is arranged on a shaft, from different perspectives in each case.
Figure 2:
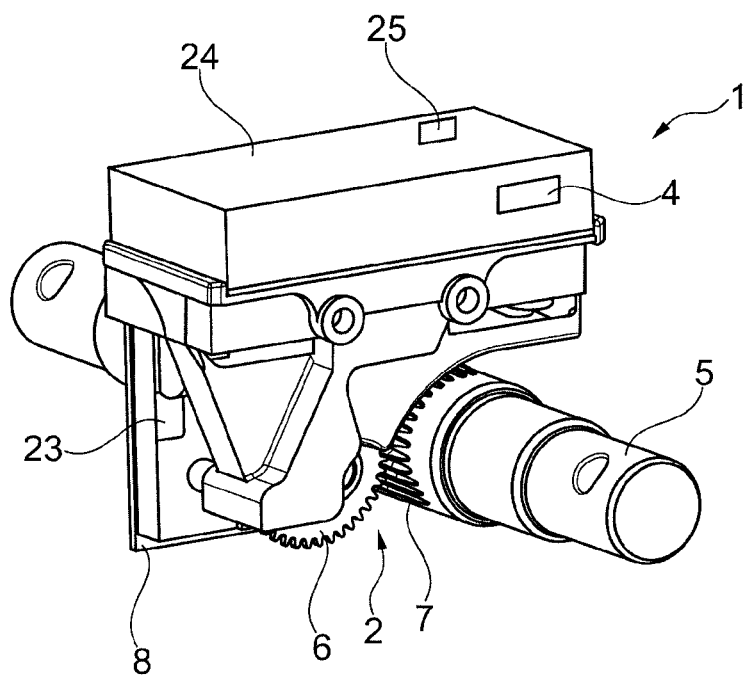
Figure 3:
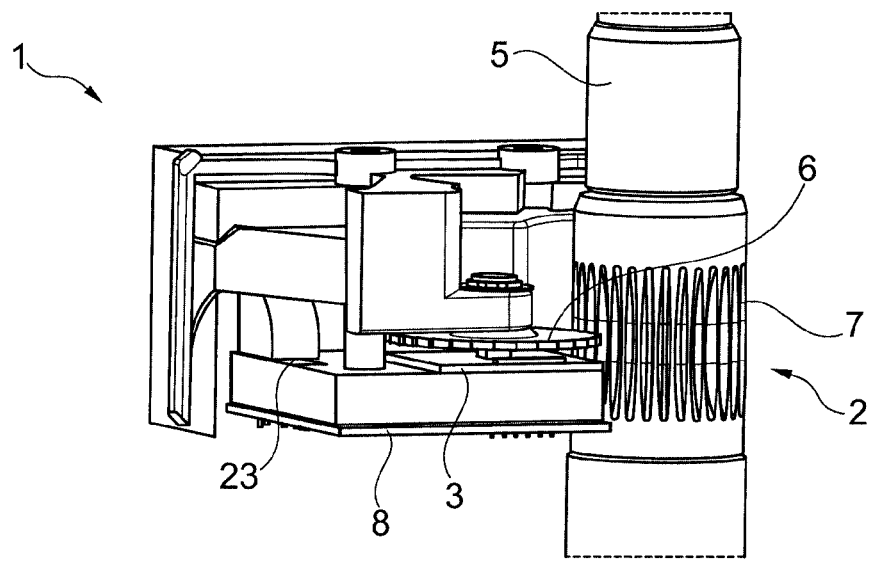
Figure 6:
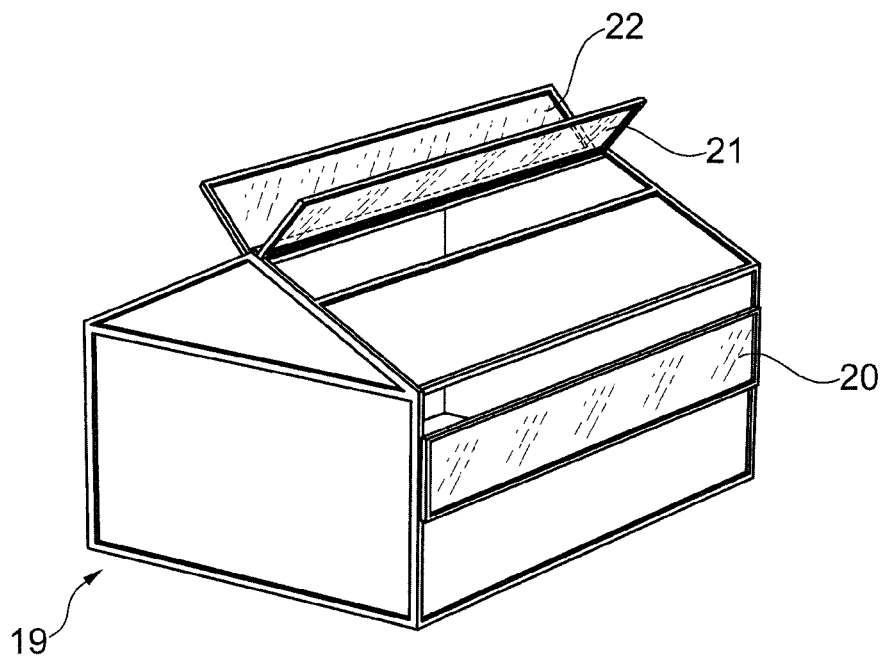
FIG. 6 shows a perspective view of a greenhouse with window elements which are driven by a drive system according to FIG. 4 or 5.

A switching device 1 according to the invention comprises a position-measuring device 2, an evaluation unit 3, an output unit 4 and an energy store in the form of an accumulator 23. The switching device 1 is arranged on a shaft 5 and coupled by means of a gearwheel 6 of the position-measuring device 2 to a pinion 7 of the shaft 5 (FIGS. 1 to 3).

The position-measuring device 2, the evaluation unit 3 and the output unit 4 are arranged on a circuit board 8. The circuit board 8 can also be composed of a plurality of circuit board components (not shown) which are connected to one another in an electrically-conducting fashion.

A sensing element 25, by means of which a fitter of the switching device 1 can teach a position, in particular, a limit position of the shaft 5, during installation of the switching device 1 is present on an upper side 24 of the switching device 1.

Furthermore, the switching device 1 is, for example, embodied in a compact fashion such that it can be arranged in a housing of the motor and/or of the transmission.

Figure 4:
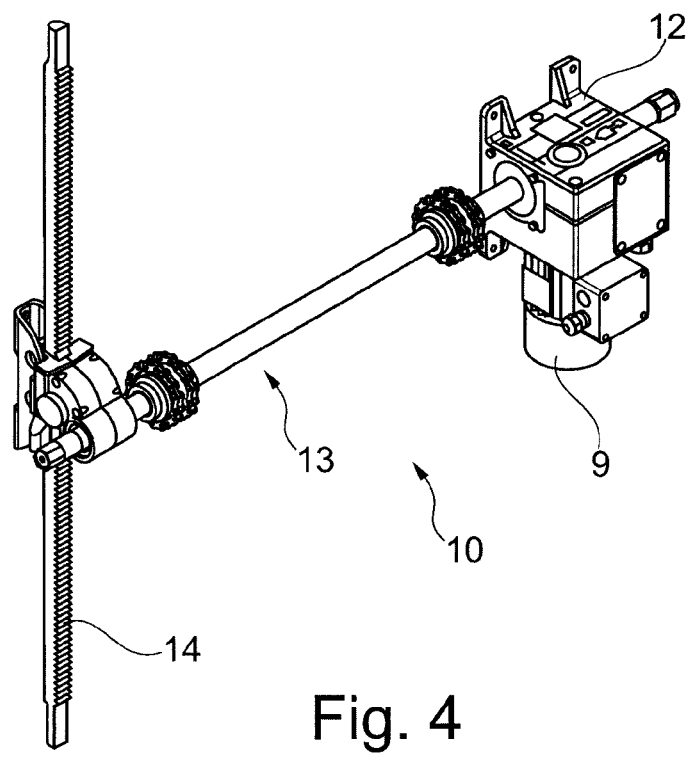
FIG. 4 shows a perspective view of a drive system according to the invention.

A drive system 10 according to the present invention comprises the electric motor 9, a transmission housing 12 in which a transmission is embodied, by means of which a shaft 13 can be moved by the electric motor 9. In the transmission housing 12 of the drive system 10 there is also a switching device 1 arranged on the shaft 13. The shaft 13 drives, for example, a toothed rack 14 (FIG. 4).

Figure 5:
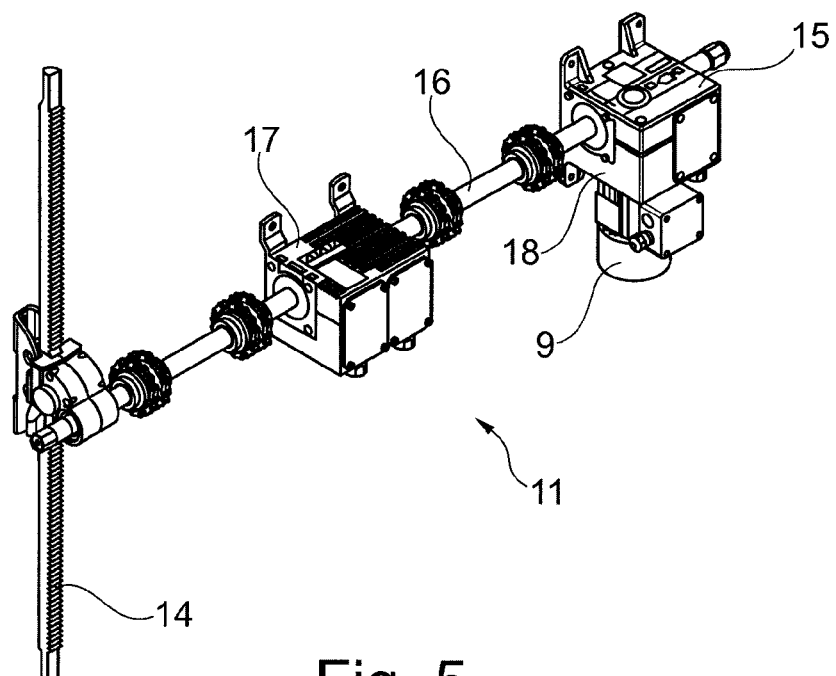
FIG. 5 shows a perspective view of a further drive system.

A further drive system 11 also comprises the electric motor 9, a further transmission housing 15 in which a transmission is embodied, by means of which a further shaft 16 can be moved by the electric motor 9. In the embodiment of the drive system 11 the switching device 1 is present in a device housing 17, separate from the transmission housing 15, on the shaft 16 (FIG. 5).

The device housing 17 can, for example, also directly adjoin in an abutting fashion a housing side 18 of the transmission housing 15. The device housing 17 can, for example, be mechanically connected, for example screwed or riveted, to the transmission housing 15.

The drive system 10, 11 is installed, for example, in a greenhouse 19, in order to move, for example open or close, window elements 20 to 22.

LIST OF REFERENCE NUMERALS

1 Switching device
2 Positioning-measuring device
3 Evaluation unit
4 Output unit
5 Shaft
6 Gearwheel
7 Pinion
8 Circuit board
9 Motor
10-11 Drive system
12 Transmission housing
13, 16 Shaft
14 Toothed rack
15 Transmission housing
17 Device housing
18 Housing side
19 Greenhouse
20 to 22 Window element
23 Accumulator
24 Upper side
25 Sensing element

The invention claimed is:

1. A geared motor comprising:
an electric motor;
a transmission;
a drive shaft; and
a switching device,
wherein the transmission rotates the drive shaft via rotation of the electric motor,
wherein the switching device is arranged on the drive shaft, the switching device comprising
a single housing, which is distinct from an electric motor housing and a transmission housing, and which is spatially separated from at least one of the electric motor housing and the transmission housing,
a contactless, absolute position-measuring device provided within the single housing and sensing a position of the drive shaft absolutely,
an evaluation unit provided within the single housing and evaluating position signals,
a gearwheel coupled to the drive shaft, and
an output unit provided within the single housing and outputting switching information for indirectly switching and/or directly switching a motor current of the electric motor as a function of a position signal,
wherein the switching device is configured to switch the electric motor,
wherein the switching device is coupled by the gearwheel of the position measuring device to a pinion, and
wherein the pinion and the drive shaft both rotate about the same axis of rotation.

2. The geared motor according to claim 1, wherein the switching device is further configured to output a position of a component driven in rotation by the motor.

3. The geared motor according to claim 1, wherein the switching device further comprises a sensing element and a fitter that determine a position, during installation of the switching device, of a component driven in rotation by the rotor.

4. The geared motor according to claim 1, wherein the evaluation unit is further configured such that, in one direction of rotation of a component driven in rotation by the motor of the switching device there are two signal outputs which are independent of one another.

5. A drive system comprising a geared motor according to claim 1, and components driven by the geared motor.

6. The geared motor according to claim 1, wherein the evaluation unit is configured to execute and evaluate a status monitoring process of a drive system comprising the switching device, the geared motor and components driven by the geared motor.

7. The geared motor according to claim 3, wherein the position of the component is a limit position.

8. The geared motor according to claim 4, wherein the evaluation unit is configured such that in each direction of rotation of the component there are two signal outputs which are independent of one another.

9. The geared motor according to claim 6, wherein the output unit is configured to switch, as a function of a position of the component, one of a single-phase or a multi-phase power supply of the electric motor.

10. The geared motor according to claim 1, wherein the drive shaft extends in a first direction, wherein the pinion is defined by a plurality of grooves provided on at least a portion of an outer peripheral surface of the drive shaft, and wherein each of the grooves extends in the first direction.

11. The geared motor according to claim 1, wherein the single housing of the switching device abuts a side surface of the transmission housing.

12. The geared motor according to claim 1, wherein the switching device further comprises an internal electrical system, provided within the single housing and providing internal power, in an absence of external power, to at least the position measuring device to sense at least one of (1) a single complete rotation of the drive shaft, (2) a plurality of rotations of the drive shaft, and (3) the position of the drive shaft.

13. A geared motor comprising:
an electric motor;
a transmission;
a drive shaft; and
a switching device,
wherein the transmission rotates the drive shaft via rotation of the electric motor,
wherein the switching device is arranged on the drive shaft, the switching device comprising
a single housing, which is distinct from a transmission housing, and which is at least partially provided within the transmission housing,
a contactless, absolute position-measuring device provided within the single housing and sensing a position of the drive shaft absolutely,
an evaluation unit provided within the single housing and evaluating position signals,
a gearwheel coupled to the drive shaft, and
an output unit provided within the single housing and outputting switching information for indirectly switching and/or directly switching a motor current of the electric motor as a function of a position signal,
wherein the switching device is configured to switch the electric motor,
wherein the switching device is coupled by the gearwheel of the position measuring device to a pinion, and
wherein the pinion and the drive shaft both rotate about the same axis of rotation.

14. The geared motor according to claim 13, wherein the switching device further comprises an internal electrical system, provided within the single housing and providing internal power, in an absence of external power, to at least the position measuring device to sense at least one of (1) a single complete rotation of the drive shaft, (2) a plurality of rotations of the drive shaft, and (3) the position of the drive shaft.

* * * * *